Aug. 2, 1927.

R. R. FRYE 1,637,562

AUTOMATIC BOTTLE CAP

Filed March 31, 1926

Inventor
Robert R. Frye
By Attorneys

Southgate Frye & Harley

Patented Aug. 2, 1927.

1,637,562

UNITED STATES PATENT OFFICE.

ROBERT R. FRYE, OF WORCESTER, MASSACHUSETTS.

AUTOMATIC BOTTLE CAP.

Application filed March 31, 1926. Serial No. 98,884.

This invention relates to a temporary cap for bottles, jars and the like, capable of general use but particularly adapted for milk and cream bottles. The principal objects of the invention are to provide a simple cap which can be placed easily on the neck of a bottle so that it will stay in position when the bottle is turned up for pouring, but can be removed easily; and to provide the same with an automatic valve or cover which will open when the bottle is turned into pouring position and will close when the bottle is set upright on its bottom so as to protect the bottle from the impurities of the air and from insects and the like.

Other objects and advantages of the invention will appear hereinafter.

Reference is to be had to the accompanying drawings in which

I am aware of the fact that various caps have been made for milk bottles but they have to be taken off when it is desired to pour or some movable part has to be manipulated to the right position in order that the contents of the bottle may be poured out. This invention involves a cap 10 having ears 11 co-operating with a clip 12 to enable the cap to be snapped over the convex edge of the mouth of a bottle. These ears are inturned and so is the clip 12 for this purpose. Therefore it is easy to snap the cap on and it can be removed by pressure on the clip 12 which is bent around for that purpose. Nevertheless the cap will not come off accidentally.

Figure 2:
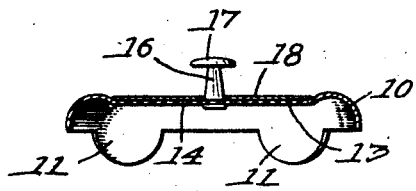
Fig. 2 is a transverse sectional view of the cap.
Figure 3:
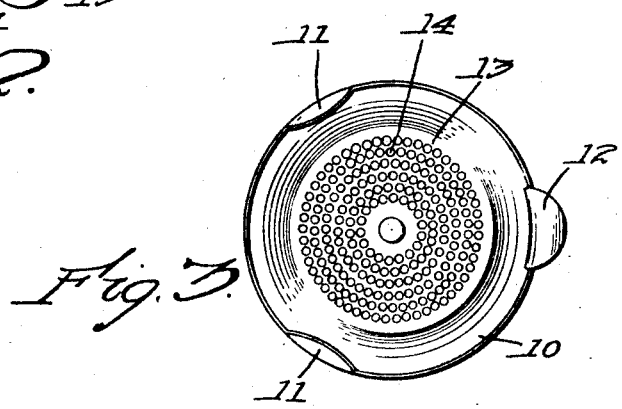
Fig. 3 is a bottom plan view.

This cap is provided with a flat surface 13 extending throughout the central portion thereof and of circular shape and this is provided with numerous small perforations 14 through which the milk or cream can be poured directly. The cap is provided with a headed stud 16, the head 17 of which is at a distance above the perforated surface 13. A plate or valve 18 is provided centered on the shank of this stud 16. This plate is permanently attached to the cap but movable with respect thereto. This plate is without perforations and covers the entire perforated surface of the cap. When the bottle is set up in an upright position with the cap on it, the plate 18 occupies the position shown in Fig. 2 and covers the perforations 14. This protects the contents from the impurities of the air and from access of insects and the like.

Figure 1:
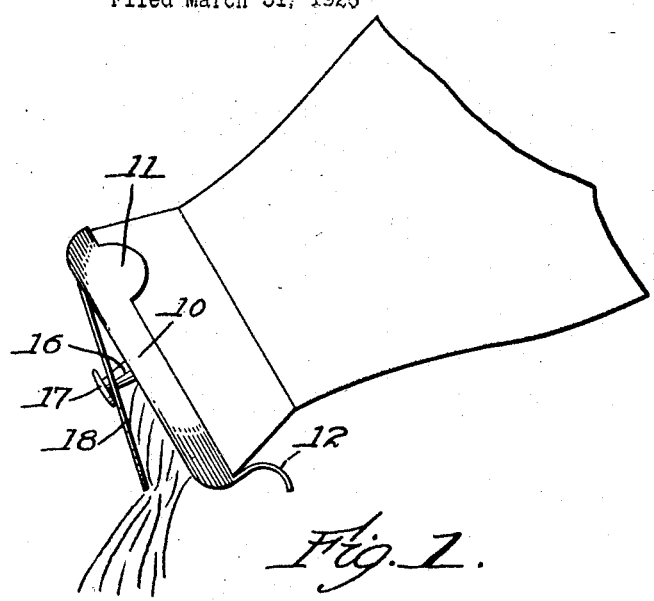
Fig. 1 is a side view of a milk bottle shown in pouring position and illustrating the operation of an automatic cap constructed in accordance with this invention.

When it is desired to pour out a part of the contents of the bottle, it is turned over in the usual way without any particular attention to the cover and the plate 18 will slide down as indicated in Fig. 1 along the shank 16 and will assume an angular position by the force of gravity. Also the milk coming out of the bottle will tend to swing it over so that the upper part of this plate 18 will swing back against the cap 10. But whatever the forces acting upon the plate 18, it allows the milk to be poured out freely through the perforations 14. The bottle is then practically sealed when it is turned up and set down on its bottom. The perforated surface 13 also acts as a strainer.

This is a very simple device consisting of very few parts and can be made in large quantities at small expense. A house needs to have only one of them or at least one for each bottle that may be used, or be set away partly used, at the same time. It is easily manufactured and no special attention has to be directed to it when it is desired to pour out the contents of the bottle.

Although I have illustrated and described only a single form of the invention I am aware of the fact that modifications can be made therein by any person skilled in the art without departing from the scope of the invention as expressed in the claims.

Therefore, I do not wish to be limited to all the details of construction herein shown and described, but what I do claim is:—

1. As an article of manufacture, a bottle cap comprising a circular perforated wall to cover the open mouth of the bottle, means for detachably holding it on the bottle, and a circular imperforate plate movably connected with said wall at its center and arranged to cover the perforations when the bottle is in upright position and to swing away from the perforated wall when the bottle is inverted in all directions.

2. As an article of manufacture, a bottle cover comprising a cap having a wall arranged to extend across the open mouth of the bottle, said wall having passages through it, a stud fixed to said wall, and having a head spaced therefrom, and a plate loosely mounted on the stud under the head for closing the passages when the bottle is set upright, whereby, when tilted, the head of the stud will hold the plate in an angular position separated from said wall.

In testimony whereof I have hereunto affixed my signature.

ROBERT R. FRYE.